(12) United States Patent
Tian

(10) Patent No.: US 11,851,199 B2
(45) Date of Patent: Dec. 26, 2023

(54) METHOD OF TRANSPORTING A BATTERY FOR AN UNMANNED AERIAL VEHICLE

(71) Applicant: Shanghai Autoflight Co., Ltd., Shanghai (CN)

(72) Inventor: Yu Tian, Hong Kong SAR (CN)

(73) Assignee: SHANGHAI AUTOFLIGHT CO., LTD., Jiangsu Province (CN)

(*) Notice: Subject to any disclaimer, the term of this patent is extended or adjusted under 35 U.S.C. 154(b) by 0 days.

(21) Appl. No.: 18/309,835

(22) Filed: May 1, 2023

(65) Prior Publication Data
US 2023/0264825 A1   Aug. 24, 2023

Related U.S. Application Data

(63) Continuation of application No. 17/065,540, filed on Oct. 8, 2020, now Pat. No. 11,673,677.

(51) Int. Cl.
*B64D 27/24* (2006.01)
*H01M 10/655* (2014.01)
(Continued)

(52) U.S. Cl.
CPC ............. *B64D 27/24* (2013.01); *B60L 50/64* (2019.02); *B60L 53/14* (2019.02); *B60L 58/27* (2019.02); *B64C 39/024* (2013.01); *H01M 10/625* (2015.04); *H01M 10/655* (2015.04); *H01M 10/6563* (2015.04); *B60L 2200/10* (2013.01); *B64U 50/19* (2023.01); *H01M 2220/20* (2013.01)

(58) Field of Classification Search
CPC ......... B64D 27/24; B60L 50/64; B60L 53/14; B60L 58/27; B60L 2200/10; B64C 39/024; H01M 10/625; H01M 10/655; H01M 10/6563; H01M 2220/20; B64U 50/19
See application file for complete search history.

(56) References Cited

U.S. PATENT DOCUMENTS

2019/0173138 A1* 6/2019 Tian .................. H01M 10/6551

FOREIGN PATENT DOCUMENTS

CN 103682518 A * 3/2014 ............ H01M 10/42
CN 105552270 A * 5/2016
(Continued)

OTHER PUBLICATIONS

Yang, CN 105552270 A, Espacenet machine translation, 2016 (Year: 2016).*
(Continued)

*Primary Examiner* — Adam A Arciero
(74) *Attorney, Agent, or Firm* — WPAT LAW, P.C.; Anthony King

(57) ABSTRACT

A method to transport a battery for an unmanned aerial vehicle using a battery transport box, the box having a box body shell and an upper cover. The unmanned aerial vehicle battery transport box further having a heat dissipating device and a heating device. When the temperature in the box body is lower than the lower limit of the set temperature range, the heating device heats the box body. When the temperature in the box body is higher than the upper limit of the set temperature range, the heat dissipating device dissipates heat of the box body. The temperature in the box body is adjusted by the heating device and the heat dissipating device.

7 Claims, 1 Drawing Sheet

(51) Int. Cl.
*H01M 10/6563* (2014.01)
*H01M 10/625* (2014.01)
*B64C 39/02* (2023.01)
*B60L 50/64* (2019.01)
*B60L 58/27* (2019.01)
*B60L 53/14* (2019.01)
*B64U 50/19* (2023.01)

(56) References Cited

FOREIGN PATENT DOCUMENTS

| CN | 108001266 A | * | 5/2018 | |
|---|---|---|---|---|
| CN | 108808172 A | * | 11/2018 | |
| WO | WO-2013141242 A1 | * | 9/2013 | ........ H01M 10/0525 |

OTHER PUBLICATIONS

Sato, WO 2013/141242 A1, WIPO machine translation, 2013 (Year: 2013).*
Kong, CN 108001266 A, Espacenet machine translation, 2018 (Year: 2018).*
Lu, CN 108808172 A, Espacenet machine translation, 2018 (Year: 2018).*
Cao, CN 103682518 A, Espacenet machine translation, 2014 (Year: 2014).*

* cited by examiner

METHOD OF TRANSPORTING A BATTERY FOR AN UNMANNED AERIAL VEHICLE

TECHNICAL FIELD

The present invention relates to the field of unmanned aerial vehicle batteries, in particular to a method of using a battery transport box.

BACKGROUND

Unmanned aerial vehicle is referred to as "a drone". The domestic unmanned aerial vehicle market has been developed for nearly 30 years, gradually expanding from the initial military field to the consumer field. In recent years, the domestic consumer unmanned aerial vehicle market has been popular, and the recognition and demand of ordinary people for unmanned aerial vehicles has gradually increased. Of course, the performance requirements for unmanned aerial vehicles are also getting higher and higher, especially for unmanned aerial vehicle batteries.

At present, the life of the power battery of the unmanned aerial vehicles on the market is less than 45 minutes, but the charging time is more than one hour. Because unmanned aerial vehicles need to reduce their take-off weight as much as possible, they cannot carry heavy and large-capacity batteries. After most unmanned aerial vehicles have been flying for ten to twenty minutes, someone must replace batteries or plug in a charging cable. As a result, three or four batteries are usually carried when people go out.

However, in the prior art, the power battery is directly placed in the transport box. This transport box does not have a charging function and requires additional power battery charging devices, which is inconvenient to carry. In addition, the temperature inside and outside the box body of this ordinary transport box is the same, which will result in power loss of the power battery at the temperature that is not conducive to the storage of the power battery, and will shorten the life of the power battery.

SUMMARY

The technical problem to be solved by the present invention is to overcome the defect that the temperature in the box body of the unmanned aerial vehicle battery transport box in the prior art is uncontrollable, so that the battery power is easy to lose power and the life of the power battery is shortened, and provides an unmanned aerial vehicle battery transport box.

The present invention solves the above technical problems through the following technical solutions:

An unmanned aerial vehicle battery transport box, comprising a box body shell and an upper cover, wherein the box body shell and the upper cover encircle a cavity, a plurality of independent cavities are provided in the cavity, the cavities are used to accommodate a power battery, the unmanned aerial vehicle battery transport box further comprises a heat dissipating device and a heating device, the heat dissipating device is connected to the upper cover or the box body shell, the heating device is circumferentially connected to the side wall of the cavity and is spaced apart from the power battery, when the temperature in the box body is lower than the lower limit of the set temperature range, the heating device heats the box body, and when the temperature in the box body is higher than the upper limit of the set temperature range, the heat dissipating device dissipates heat of the box body.

In this solution, a heat dissipating device and a heating device are provided in the unmanned aerial vehicle battery transport box. When the temperature in the box body is lower than the optimal temperature range required for storage of the power battery, the heating device starts to work to heat the box body. When the temperature in the box body is higher than the optimal temperature range required for storage of the power battery, the heat dissipating member starts to work to dissipate heat inside the box body. The heating device and the heat dissipating device make the temperature in the box body always in a constant temperature range suitable for storage of the power battery, so as to ensure that the power battery is in a storage environment with the optimal temperature range, prevent serious power loss of the power battery, and ensure the life of the power battery.

Preferably, a temperature control system is further provided on the box body shell, and the temperature control system is used to detect the temperature in the box body and to control the ON/OFF of the heat dissipating device and the heating device.

In this solution, a temperature control system is provided on the box body shell, which can monitor the temperature inside the box body in real time, and automatically control the ON/OFF of the heat dissipating device and the heating device, so as to control the temperature in the unmanned aerial vehicle battery transport box within a constant temperature range suitable for storage of the power battery.

Preferably, the number of the heat dissipating devices is not less than one, the heat dissipating device comprises a heat dissipating member and a heat dissipating hole, the heat dissipating hole is in communication with the cavity from the outside of the box body shell or the upper cover, the heat dissipating member is rotatably connected to the box body shell or the upper cover and faces the inside of the box body, the heat dissipating member corresponds to the heat dissipating hole, the heat dissipating member is rotatable around the axial direction of the heat dissipating member.

In this solution, heat dissipating holes are provided to facilitate the circulation of air inside and outside the box body, and the rotation of the heat dissipating member is used to accelerate the flow rate of air inside and outside the box body and accelerate the replacement of air inside and outside the box body, so as to dissipate hear inside and outside the unmanned aerial vehicle battery transport box.

Preferably, the heat dissipating element is a heat dissipating fan.

In this solution, the heat dissipating fan is simple in structure, mature in technology, and easy to purchase.

Preferably, grooves are provided around the side wall of the cavity, the heat dissipating device is embedded in the groove, and the heating device is capable of generating heat to heat the box body.

In this solution, the above structural form is adopted, the groove is provided to facilitate embedding the heat dissipating device, and it is also beneficial to avoid contact between the power battery and the heating device, and prevent the power battery from getting hot and damaging the battery.

Preferably, the heating device is a heating film.

In this solution, the heating film has a thin thickness, small space occupation, high electric-heat conversion efficiency, and a large proportion of radiant heat. The use of the heating film makes the temperature heating speed in the box body faster and saves space.

Preferably, an energy storage battery and a charger are provided in the box body shell, a power interface is provided on the outer wall of the box body shell, the power interface is electrically connected with both the energy storage battery and the charger, the charger is electrically connected with the energy storage battery, and the charger is used to charge the power battery.

In this solution, an energy storage battery and a charger are provided in the box body, and the energy storage battery can charge the power battery without external power supply condition. A power interface is provided on the outer wall of the box body to facilitate charging of the power battery when the external power supply condition permits. The unmanned aerial vehicle battery transport box can not only transport the unmanned aerial vehicle battery, but also charge the unmanned aerial vehicle battery.

Preferably, one end of the unmanned aerial vehicle battery transport box along the length direction is provided with a roller, and the other end thereof is provided with a telescopic pull rod, one end of the telescopic pull rod is slidable along the length direction of the box body shell to retract to or protrude from the end of the box body shell.

In this solution, a roller and a telescopic pull rod are provided on the box body to facilitate the push and pull of the unmanned aerial vehicle battery transport box and save physical power.

Preferably, the roller is provided with a steering mechanism for changing the direction of the roller, the telescopic pull rod is provided with a locking mechanism, and the locking mechanism is used to lock the telescopic pull rod to restrict the telescopic pull rod from sliding along the length direction of the box body shell.

In this solution, the roller is provided with a steering mechanism to facilitate changing the direction of the roller, and the flexibility is higher. The telescopic pull rod is provided with a locking mechanism to prevent the telescopic pull rod from changing state without external force.

Preferably, the box body shell and the upper cover are further provided with lock catches for restricting the upper cover from rotating with respect to the box body.

In this solution, a lock catch is provided to prevent the upper cover from automatically opening and damaging the power battery during transportation, which improves the safety of the unmanned aerial vehicle battery transport box.

Preferably, the box body and the upper cover are made of explosion-proof materials.

In this solution, the box body and the upper cover are made of explosion-proof materials, because the battery is a flammable and explosive dangerous product. When being made of explosion-proof materials, if the battery in the box body explodes accidentally, the box body can prevent combustion and prevent the box body from exploding.

On the basis of conforming to common knowledge in the field, the above preferred conditions can be combined arbitrarily to obtain preferred examples of the present invention.

The positive improvement effect of the present invention is that the unmanned aerial vehicle battery transport box of the present invention adjusts the temperature in the box body by the heating device and the heat dissipating device, so as to ensure that the power battery is in the storage environment with the optimal temperature range, prevent serious power loss of the power battery, and ensure the life of the power battery.

DESCRIPTION OF REFERENCE NUMBERS

Figure 1:
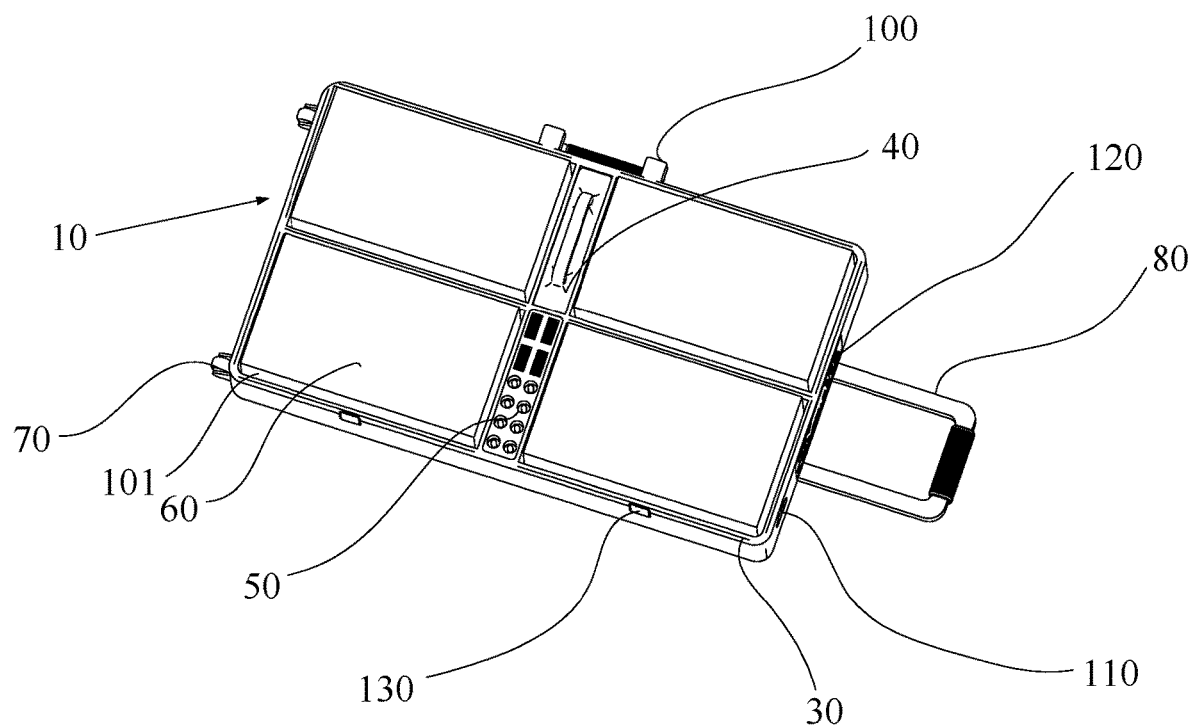
FIG. 1 is a schematic diagram of the internal structure of an unmanned aerial vehicle battery transport box according to a preferred embodiment of the present invention.

Box body shell 10
Cavity 101
Heat dissipating device 20
Heat dissipating fan 201
Heat dissipating hole 202
Heating film 30
Energy storage battery 40
Charger 50
Power battery 60
Roller 70
Telescopic pull rod 80
Upper cover 90
Lock catch 100
Power interface 110
Temperature monitoring panel inside the box 120
Hinge 130

DESCRIPTION OF THE EMBODIMENTS

Hereinafter, the present invention will be explained more clearly and completely by way of embodiments in conjunction with the accompanying drawings, but the present invention is not limited to the scope of the embodiments.

Figure 2:
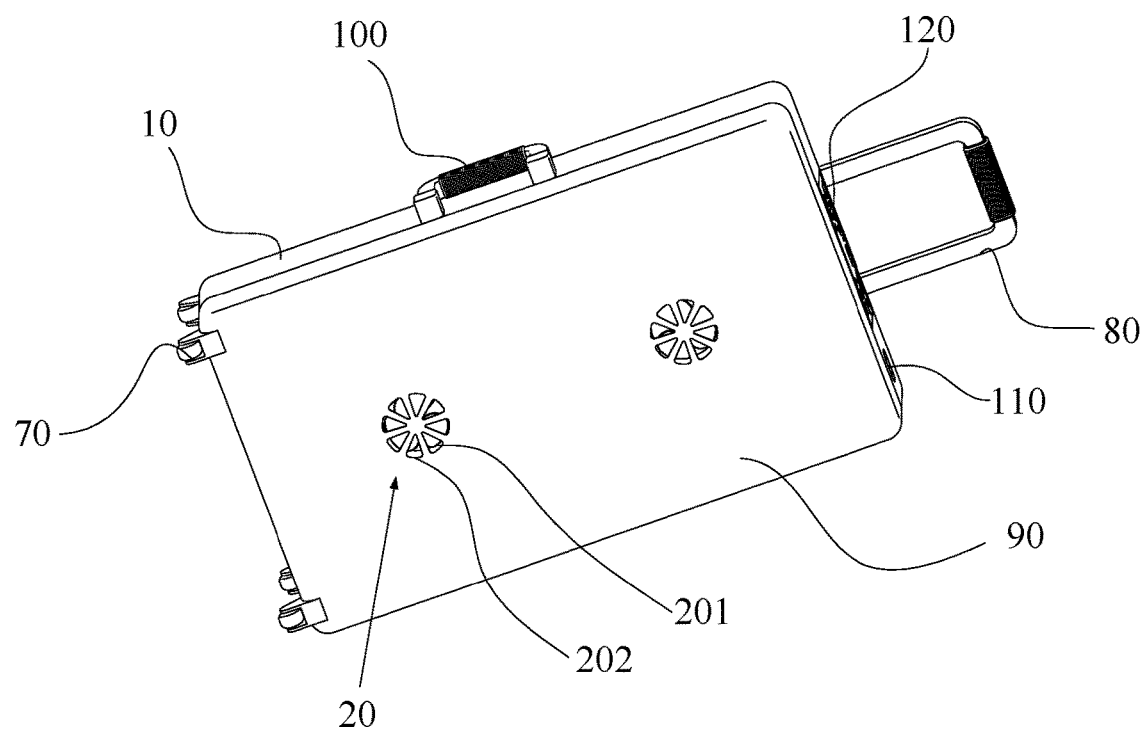
FIG. 2 is a schematic diagram of the external structure of an unmanned aerial vehicle battery transport box according to a preferred embodiment of the present invention.

As shown in FIGS. 1 and 2, the present invention provides an unmanned aerial vehicle battery transport box, comprising a box body shell 10 and an upper cover 90, wherein the box body shell 10 and the upper cover 90 encircle a cavity, a plurality of independent cavities 101 are provided in the cavity, the cavities 101 are used to accommodate a power battery 60, the unmanned aerial vehicle battery transport box further comprises a heat dissipating device 20 and a heating device, the heat dissipating device 20 is connected to the upper cover 90 or the box body shell 10, the heating device is circumferentially connected to the side wall of the cavity 101 and is spaced apart from the power battery 60, when the temperature in the box body is lower than the lower limit of the set temperature range, the heating device heats the box body, and when the temperature in the box body is higher than the upper limit of the set temperature range, the heat dissipating device 20 dissipates heat of the box body.

A heat dissipating device 20 and a heating device are provided in the unmanned aerial vehicle battery transport box. When the temperature in the box body is lower than the optimal temperature range required for storage of the power battery 60, the heating device starts to work to heat the box body. When the temperature in the box body is higher than the optimal temperature range required for storage of the power battery 60, the heat dissipating device 20 starts to work to dissipate heat inside the box body. The heating device and the heat dissipating device 20 make the temperature in the box body always in a constant temperature range suitable for storage of the power battery 60, so as to ensure that the power battery 60 is in a storage environment with the optimal temperature range, prevent serious power loss of the power battery 60, and ensure the life of the power battery 60.

As shown in FIG. 1, in this embodiment, the upper cover 90 and the box body shell 10 are connected by a hinge 130, and the number of cavities 101 in which the power battery 60 is accommodated in the box body is not limited. In this embodiment, there are a total of four cavities 101 in two rows and two columns, that is, an unmanned aerial vehicle battery transport box can store four power batteries 60 at the same time.

A temperature control system is further provided on the box body shell 10, and the temperature control system is used to detect the temperature in the box body and to control the ON/OFF of the heat dissipating device 20 and the heating device. A temperature control system is provided on the box body shell 10, which can monitor the temperature inside the box body in real time, and automatically control the ON/OFF of the heat dissipating device 20 and the heating device, so as to control the temperature in the unmanned aerial vehicle battery transport box within a constant temperature range suitable for storage of the power battery.

In this embodiment, the temperature control system further comprises a temperature monitoring panel in the box 120. The temperature monitoring panel in the box 120 is provided on the outer wall of the box body for monitoring the temperature inside the box body in real time.

The number of the heat dissipating devices 20 is not less than one, the heat dissipating device 20 comprises a heat dissipating member and a heat dissipating hole 202, the heat dissipating hole 202 is in communication with the cavity 101 from the outside of the box body shell 10 or the upper cover 90, the heat dissipating member 202 is rotatably connected to the box body shell 10 or the upper cover 90 and faces the inside of the box body, the heat dissipating member corresponds to the heat dissipating hole, and the heat dissipating member is rotatable around the axial direction of the heat dissipating member. The heat dissipating member is a heat dissipating fan 201. Heat dissipating holes 202 are provided to facilitate the circulation of air inside and outside the box body, and the rotation of the heat dissipating member is used to accelerate the flow rate of air inside and outside the box body and accelerate the replacement of air inside and outside the box body, so as to dissipate hear inside and outside the unmanned aerial vehicle battery transport box. The heat dissipating fan 201 is simple in structure, mature in technology, and easy to purchase. It should be noted that the number of the heat dissipating devices 20 and the position thereof on the box body shell or the upper cover 90 are not limited. Preferably, the heat dissipating device 20 can directly face the largest surface of the power battery 60.

As shown in FIG. 2, in this embodiment, two heat dissipating fans 201 are connected to the upper cover 90, and each heat dissipating fan 201 directly faces two cavities 101 where the power battery 60 is placed, that is, each heat dissipating fan 201 can directly dissipate heat of the two power batteries 60 simultaneously.

Grooves are provided around the side wall of the cavity 101, the heat dissipating device 20 is embedded in the groove, and the heating device is capable of generating heat to heat the box body. The heating device is a heating film 30. The groove is provided to facilitate embedding the heat dissipating device 20, and it is also beneficial to avoid direct contact between the power battery and the heating device, and prevent the power battery from getting hot and damaging the battery. The heating film 30 is used, which has a thin thickness, small space occupation, high electric-heat conversion efficiency, and a large proportion of radiant heat. The use of the heating film makes the temperature heating speed in the box body faster and saves space.

It should be noted that the heating film 30 may also be pasted on the inner surface of the side wall of the cavity 101, and there is a gap between the heating film 30 and the power battery 60. As shown in FIG. 1, in this embodiment, the heating film 30 is embedded in a groove (the groove is not shown in the drawings) (only a schematic diagram of the position of the heating film 30 is shown in FIG. 1). Moreover, a layer of EVA sponge is further provided on the inner surface of the side wall of the cavity 101 (the EVA sponge block is not shown in the drawings), which on the one hand, is used to dampen the power battery 60 during transportation, and on the other hand, to avoid direct contact between the power battery 60 and the side wall of the cavity 101 so that the temperature of the power battery 60 increases.

As shown in FIG. 1, an energy storage battery 40 and a charger 50 are provided in the box body shell 10, a power interface 110 is provided on the outer wall of the box body shell 10, the power interface 110 is electrically connected with both the energy storage battery 40 and the charger 50, the charger 50 is electrically connected with the energy storage battery 40, and the charger 50 is used to charge the power battery 60. An energy storage battery 40 and a charger 50 are provided in the box body, and the energy storage battery 40 can charge the power battery 60 without external power supply condition. A power interface 110 is provided on the outer wall of the box body to facilitate charging of the power battery 60 when the external power supply condition permits. The unmanned aerial vehicle battery transport box can not only transport the unmanned aerial vehicle battery, but also charge the unmanned aerial vehicle battery.

The positions of the energy storage battery 40 and the charger 50 in the box body shell 10 are not limited. As shown in FIG. 1, in this embodiment, the energy storage battery 40 and the charger 50 are provided in the middle position of two columns of cavities as one row, that is, the energy storage battery 40 and the charger 50 are provided in a column to separate the two columns of cavities, which is convenient for wiring.

As shown in FIGS. 1 and 2, one end of the unmanned aerial vehicle battery transport box along the length direction is provided with a roller 70, and the other end thereof is provided with a telescopic pull rod 80, one end of the telescopic pull rod 80 is slidable along the length direction of the box body shell 10 to retract to or protrude from the end of the box body shell 10. The roller 70 is provided with a steering mechanism for changing the direction of the roller 70, the telescopic pull rod 80 is provided with a locking mechanism, and the locking mechanism is used to lock the telescopic pull rod 80 to restrict the telescopic pull rod 80 from sliding along the length direction of the box body shell 10. A roller 70 and a telescopic pull rod 80 are provided on the box body to facilitate the push and pull of the unmanned aerial vehicle battery transport box and save physical power. The roller 70 is provided with a steering mechanism to facilitate changing the direction of the roller 70, and the flexibility is higher. The telescopic pull rod 80 is provided with a locking mechanism to prevent the telescopic pull rod 80 from changing state without external force.

As shown in FIG. 2, the box body shell 10 and the upper cover 90 are further provided with lock catches 100 for restricting the upper cover 90 from rotating with respect to the box body. A lock catch 100 is provided to prevent the upper cover 90 from automatically opening and damaging the power battery 60 during transportation, which improves the safety of the unmanned aerial vehicle battery transport box.

The box body and the upper cover 90 are made of explosion-proof materials. The box body and the upper cover 90 are made of explosion-proof materials, because the battery is a flammable and explosive dangerous product. When being made of explosion-proof materials, if the battery in the box body explodes accidentally, the box body can prevent combustion and prevent the box body from exploding.

The working principle of the unmanned aerial vehicle battery transport box provided by the present invention is as follows: a temperature range suitable for the storage of the power battery 60 is set in the temperature control system, the temperature sensor in the temperature control system monitors the temperature inside the box in real time, if the temperature inside the box is lower than the lower limit of the set temperature range, the heating device, that is, the heating film 30, starts to work, and heats the box body through heat transfer; if the temperature inside the box is higher than the upper limit of the set temperature range, the heat dissipating device 20, that is, the heat dissipating fan 201, starts to work, and the forced convection of the fan accelerates the dissipation of heat, thereby cooling the inside of the box body. The unmanned aerial vehicle battery transport box uses the charger 50 to charge the power battery 60 in the box body. If there is a power supply condition (220V power supply), a power line is connected at the power interface 110 to charge the power battery 60. If there is no power supply condition, the power battery 60 is charged by the energy storage battery 40.

The unmanned aerial vehicle battery transport box of the present invention can not only ensure that the temperature inside the box is in a constant range, but also can charge the power battery 60, and can also charge the power battery 60 without power supply condition. That is, while ensuring that the power battery 60 that has been charged has less power loss, the power life is ensured, and it also has the function of charging under different conditions. At the same time, it has an explosion-proof function, and the safety is more reliable.

Although the specific embodiments of the present invention have been described above, those skilled in the art should understand that this is only an example, and the protection scope of the present invention is defined by the appended claims. Those skilled in the art can make various changes or modifications to these implementations without departing from the principle and essence of the present invention, but these changes and modifications all fall within the protection scope of the present invention.

What is claimed is:

1. A method of transporting a power battery and an energy storage battery for an unmanned aerial vehicle using a battery transport box, said method comprising:
    providing a box body shell and an upper cover;
    providing a first end;
    providing a second end opposite to the first end;
    providing a plurality of rollers disposed on the first end of the battery transport box;
    providing a telescopic pull rod disposed on the second end of the battery transport box;
    wherein the box body shell and the upper cover encircle an enclosure, and a plurality of independent cavities are provided in the enclosure;
    wherein each of the cavities are used to accommodate the power battery;
    providing a heat dissipating device; and
    providing a heating device;
    wherein the heat dissipating device is connected to the upper cover or the box body shell;
    wherein the heating device is coupled to a side wall of the enclosure and is spaced apart from the power battery;
    heating the box body with the heating device when the temperature in the box body is lower than a lower limit of a set temperature range;
    using the heat dissipating device to dissipate heat of the box body when the temperature in the box body is higher than an upper limit of the set temperature range;
    disposing the energy storage battery in between two of said plurality of independent cavities;
    providing a charger disposed adjacent to the energy storage battery and is disposed in between another two of said plurality of independent cavities;
    wherein the energy storage battery is disposed equidistant to the first end and the second end; and
    wherein the charger is disposed equidistant to the first end and the second end.

2. The method of transporting a power battery and an energy storage battery for an unmanned aerial vehicle using a battery transport box as recited in claim 1, further providing a temperature control system on the box body shell, and detecting a temperature in the box body using the temperature control system; controlling an ON/OFF of the heat dissipating device and the heating device using the temperature control system.

3. The method of transporting a power battery and an energy storage battery for an unmanned aerial vehicle using a battery transport box as recited in claim 1, wherein the heat dissipating device comprises a heat dissipating member and a heat dissipating hole, the heat dissipating hole is in communication with the enclosure from the outside of the box body shell or the upper cover; wherein the heat dissipating member is rotatably connected to the box body shell or the upper cover and faces the inside of the box body.

4. The method of transporting a power battery and an energy storage battery for an unmanned aerial vehicle using a battery transport box as recited in claim 3, wherein the heat dissipating member is a heat dissipating fan.

5. The method of transporting a power battery and an energy storage battery for an unmanned aerial vehicle using a battery transport box as recited in claim 1, further providing a plurality of grooves around the side wall of the enclosure; wherein the heat dissipating device is embedded in the plurality of grooves.

6. The method of transporting a power battery and an energy storage battery for an unmanned aerial vehicle using a battery transport box as recited in claim 5, wherein the heating device is a heating film.

7. The method of transporting a power battery and an energy storage battery for an unmanned aerial vehicle using a battery transport box as recited in claim 1, further providing a power interface on the outer wall of the box body shell; wherein the power interface is electrically connected to both the energy storage battery and the charger; wherein the charger is electrically connected to the energy storage battery, and the charger is used to charge the power battery.

* * * * *